(12) United States Patent
Yagi

(10) Patent No.: US 6,896,396 B2
(45) Date of Patent: May 24, 2005

(54) AUTOMOTIVE INFRARED LAMP

(75) Inventor: Seiichiro Yagi, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 0 days.

(21) Appl. No.: 10/186,947

(22) Filed: Jul. 2, 2002

(65) Prior Publication Data

US 2003/0007363 A1 Jan. 9, 2003

(30) Foreign Application Priority Data

Jul. 6, 2001 (JP) ..................................... P.2001-205708

(51) Int. Cl.[7] .............................................. F21V 11/00
(52) U.S. Cl. ....................... 362/510; 362/293; 362/509
(58) Field of Search ................................ 362/507, 509, 362/510, 514, 293, 290

(56) References Cited

U.S. PATENT DOCUMENTS

| | | | |
|---|---|---|---|
| 4,604,680 A | | 8/1986 | Levin et al. |
| 4,695,930 A | | 9/1987 | Wierzbicki et al. |
| 5,448,461 A | * | 9/1995 | Fast et al. .................. 362/293 |
| 6,601,980 B2 | * | 8/2003 | Kobayashi et al. ......... 362/510 |
| 2001/0050344 A1 | | 12/2001 | Albou |

FOREIGN PATENT DOCUMENTS

| | | |
|---|---|---|
| DE | 39-32-216 | 4/1991 |
| EP | 0-936-107 | 8/1999 |
| GB | 2 311 593 A | 1/1997 |

* cited by examiner

*Primary Examiner*—John Anthony Ward
(74) *Attorney, Agent, or Firm*—Sughrue Mion, PLLC

(57) ABSTRACT

An infrared radiating lamp which dilutes the red light emitted from the front lens of the lamp by causing a peripheral portion of the lens to emit white light or causing a small amount of white light to pass through a generally central portion of the lens so that the lamp will not be mistakenly recognized as a tail lamp or a stop lamp. The lamp includes a lamp body, a lens attached to a front opening portion of the lamp body and which cooperates with the lamp body to define a lamp chamber, a reflector provided at an inner side of the lamp body, a light source provided forward of the reflector, and an infrared transmitting film that reflects a visible light component and transmits an infrared component. A region having no infrared transmitting film is provided at an outer periphery of the infrared transmitting film. Light from the light source that does not pass through the infrared transmitting film is directed to the peripheral portion of the lens, so that the peripheral portion around the region in the lens that emits red light emits white light, thereby diluting the emission of red light. A similar effect can be obtained by forming a plurality of pores in the infrared transmitting film.

7 Claims, 7 Drawing Sheets

AUTOMOTIVE INFRARED LAMP

CROSS-REFERENCE TO RELATED APPLICATIONS

Not applicable

STATEMENT REGARDING FEDERALLY SPONSORED RESEARCH OR DEVELOPMENT

Not applicable

REFERENCE TO SEQUENCE LISTING, A TABLE, OR A COMPUTER PROGRAM LISTING COMPACT DISK APPENDIX

Not applicable

BACKGROUND OF THE INVENTION

The present invention relates to an automotive infrared radiating lamp intended for installation on a motor vehicle and which illuminate an area forward of the vehicle with infrared light. More particularly, the invention relates to an automotive infrared radiating lamp for use together with a CCD camera having a sensitivity in a range that includes near infrared.

In a conventional lamp of the same general type as that to which the invention pertains, a visible light source and a parabolic reflector may be disposed within a lamp chamber defined by a lamp body and a front lens. An infrared transmitting filter formed by an infrared transmitting film that reflects visible light and transmits infrared light and which covers the entire surface of a glass plate is disposed between a light source and the front lens so as to entirely cover the front opening portion of the lamp chamber. Thus, the entire light output of the light source radiated in the direction of the lens passes through the infrared transmitting fillet. When the light reflected by the reflector passes through the infrared transmitting film, the visible light component thereof is cut off so that primarily only the invisible infrared component is emitted through the front lens.

An image of the infrared-irradiated area forward of the vehicle is sensed by a CCD camera which is mounted at a forward position on the motor vehicle and which has a sensitivity covering the near-infrared range. The image is processed by an image processing device, and the result displayed on a monitor screen in the passenger compartment of the vehicle. Using this system, the driver can recognize on the monitor screen the presence of persons, lane markings, obstacles, etc., even at considerable distances forward of the vehicle.

However, the infrared transmitting filter (infrared transmitting film) is not able to completely cut off long-wavelength visible light at wavelengths of about 700 to 800 nm (red light component). Therefore, together with infrared light, a portion of the visible light from the light source (red light component) is transmitted through the infrared transmitting filter and emitted through the front lens together with infrared light, so that the front lens emits red light (the lamp glows red). Hence, there is a danger of the driver of an oncoming vehicle or a pedestrian falsely recognizing a lighted infrared radiating lamp mounted at a front position of a motor vehicle as a tail lamp or a stop lamp, which gives rise to a safety problem.

BRIEF SUMMARY OF THE INVENTION

The present inventor conceived that if a portion of the light from the light source is allowed to pass though to a peripheral portion of the front lens without passing through the infrared transmitting filter so as to illuminate the peripheral portions of the red-light-emitting front lens with white light, the red light emission would become less conspicuous. Experiments have concluded that this concept is indeed very effective. The inventor has proposed the present invention based on this concept.

The invention has been accomplished based on the foregoing problems of the conventional art and the inventor's conception. It is an object of the invention to provide an infrared radiating lamp in which the emission of red light from the front lens is diluted by white light emitted from a peripheral portion of the lens or by a small amount of white light emitted from approximately a central portion of the lens, thereby preventing the lit lamp from being falsely recognized as a tail lamp, a stop lamp, or the like.

In order to achieve the foregoing and other objects of the invention, an infrared radiating lamp in accordance with comprises a container-like lamp body, a lens attached to a front opening portion of the lamp body which cooperates with the lamp body to define a lamp chamber; a reflector provided at an inner side of the lamp body, a light source provided forward of the reflector, and an infrared transmitting film disposed between the light source and the lens, wherein a region having no infrared transmitting film is provided at an outer periphery of the infrared transmitting film and/or within the infrared transmitting film.

In operation, when light emitted from the light source and reflected from the reflector passes through the infrared transmitting film provided forward of the reflector, a visible light component is cut off so that light formed mainly by an invisible infrared component passes through, the lens. However, the outgoing light from the lens still contains a visible light component (red light component) that cannot be eliminated by the infrared transmitting film. Therefore, when the lamp is illuminated, the lens emits some amount of red light. However, by providing the region having no infrared transmitting film at the outer periphery of the infrared transmitting film, light from the light source that does not pass through the infrared transmitting film passes through a peripheral portion of the lens. Therefore, the peripheral portion of the lens emits white light, which serves to dilute the red color of the light emitted from the lens. Furthermore, in the case where a region having no infrared transmitting film is provided within the infrared transmitting film, light from the light source that does not pass through the infrared transmitting film passes though an approximately central portion of the lens in a small amount, thereby serving to dilute the red color of light emitted from the lens. That is, although the quantity of red light emitted from the lens is not substantially different from the quantity of red light emitted in the conventional construction in which all the light emitted from the light source toward the lens passes through the infrared transmitting film, the lamp of the invention dilutes the red light with white light emitted from around the periphery around the red light-emitting region in the lens or by a small amount of white light passing through an approximately central portion of the lens.

As for the basic construction of the infrared radiating lamp, various types can be employed, including a reflection-type illumination optical system wherein light from the light source is reflected by a parabolic reflector to form substantially parallel rays and a desired distribution of light is achieved with light distribution control steps formed on the front lens, a type which achieves the desired distribution of light using a reflector that has a plurality of contiguous divided reflection surfaces for light distribution control, and a type constructed with a projection-type illumination optical system that reflects light from the light source with an ellipsoidal reflector and then produces substantially parallel rays with a projection lens. The invention is applicable to any of these forms.

Further in accordance with the invention, a transparent member may be provided between the reflector and the lens, the transparent member being provided with the infrared transmitting film.

If in a simple construction using an infrared transmitting filter (a transparent member with an infrared transmitting film) the visible light cutting performance of the infrared transmitting filter (infrared transmitting film), for example, deteriorates due to high temperature heating, it is appropriate to replace only the infrared transmitting filter without replacing major component parts of the lamp.

Moreover, in accordance with the invention, the lens may be provided with the infrared transmitting film. In such a case, since the infrared transmitting film is formed directly on the lens, there is no need for a separate transparent member for supporting the infrared transmitting film, as a result of which the lamp structure is correspondingly simple. Furthermore, retention of heat within the lamp chamber is less likely, and thermal deterioration of the infrared transmitting film is reduced in comparison with a construction in which an infrared transmitting filter (a transparent member having an infrared transmitting film) is employed.

DETAILED DESCRIPTION OF THE INVENTION

The invention will be described with reference to preferred embodiments thereof.

Figure 1:
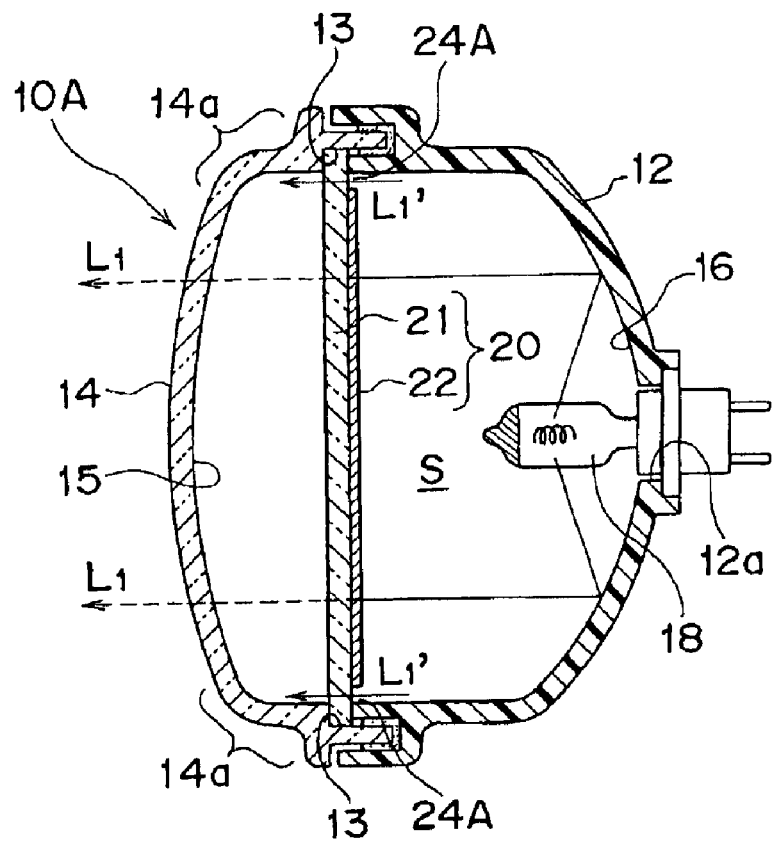
FIG. 1 is a longitudinal sectional view of an infrared radiating lamp in accordance with a first embodiment of the invention.
Figure 2:
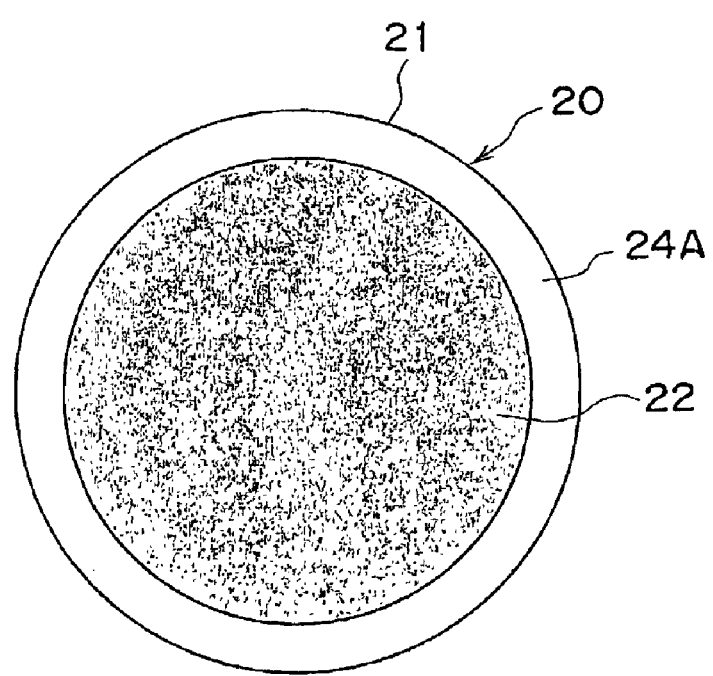
FIG. 2 is a rear side elevation of an infrared transmitting filters, which is a portion of the lamp of FIG. 1.

FIGS. 1 and 2 illustrate an embodiment of an infrared radiating lamp that is suitably applicable to a nighttime forward view detection system, and that is used together with an infrared CCD camera, which is mounted in, for example, at an upper position in the passenger compartment of the vehicle, for sensing an image of the field of view forward of the vehicle. FIG. 1 is a longitudinal sectional view of the infrared radiating lamp in accordance with the first embodiment of the invention. FIG. 2 shows a rear side elevation of an infrared transmitting filter. which is a portion of the lamp.

The nighttime forward view detection system includes as primary components an infrared radiating lamp 10A mounted at a front position on the vehicle for emitting infrared light forward of the vehicle, an infrared CCD camera (not shown) mounted, for example, at an upper position in the passenger compartment of the vehicle for sensing an image of the field of view forward of the vehicle, an image processing-analyzing device for analyzing the image sensed by the CCD camera, and a head-up display (HUD).

Images of otherwise invisible distant pedestrians, obstacles, lane markings and the like sensed by the CCD camera are applied to the image processing-analyzing device. Edge processing and pattern recognition of the images therein allows easy recognition of a pedestrian, obstacle, lane marking, etc. The images of a pedestrian, obstacles, lane markings, etc., are displayed to the driver via the head-up display (HUD), and certain characteristics of objects in the road (pedestrian, obstacle, lane markings, etc) are determined by shape recognition, and is indicated to the driver via voice.

As shown in FIG. 1, the infrared radiating lamp 10A includes a synthetic resin lamp body 12, a front lens 14 attached to a front opening portion of the lamp body 12 and which defines a lamp chamber S in cooperation with the lamp body 12, a parabolic reflector 16 formed together with an inner peripheral surface of the lamp body 12, a halogen bulb 18 forming a light source and which is inserted into a bulb mounting hole 12a provided in a rear vertex portion of the lamp body 12, and an infrared transmitting filter 20 extending transversely forward of the reflector 16. Light distribution control cylindrical steps 15 that distribute light in a diverging manner in a predetermined direction are provided on the front lens 14.

As shown in FIG. 2. the infrared transmitting filter 20 includes an infrared transmitting film 22 formed on a surface of a transparent glass plate 21. A peripheral portion of the infrared transmitting filter 20 (glass plate 21) is provided with a ring-shaped region 24A having no infrared transmitting film. The ring-shaped region 24A has a predetermined width. That is, the infrared transmitting film 22 is formed on the rear surface of the glass plate 21, except for a peripheral region of predetermined width.

As shown in FIG. 1, the peripheral portion of the infrared transmitting filter 20 is engaged with a groove 13 formed in an engagement portion between the lamp body 12 and the front lens 14, and is thus positioned and fixed. That is, the infrared transmitting filter 20 can be fixed in a sandwiched manner simultaneously with the attachment of the front lens 14 to the lamp body 12. This is convenient for the replacement of the infrared transmitting filter 20.

When the lamp is turned on, light from the light source which is reflected by the reflector 16 passes through the infrared transmitting filter 20 and the infrared transmitting film 22 thereof, as indicated by reference character $L_1$ in FIG. 1, whereby a visible light component is cut. Therefore, light composed primarily of an invisible infrared component passes through the front lens 14. However, the outgoing light from the front lens 14 contains a visible light component (red light component) that remains despite the action of the infrared transmitting film 22. Therefore, when the lamp is on, the front lens 14 emits some amount of red light.

However, light from the light source that does not pass through the infrared transmitting film 22 is directed to a peripheral portion of the front lens 14 via the region 24A having no infrared transmitting film, as indicated by reference character $L_1'$ in FIG. 1. Therefore, the peripheral portion 14a of the front lens 14 emits white light, thus serving to dilute the red color of light emission from the front lens 14. That is, although the quantity of red light emission from the front lens 14 is substantially no different from the quantity of red light emitted in the conventional construction in which the entire light output from the light source in the direction of the front lens 14 passes through the infrared transmitting film 22, in this embodiment the red color is significantly diluted by the white light emitted from the peripheral portion 14a around a red light-emitting region of the front lens 14.

Figure 3:
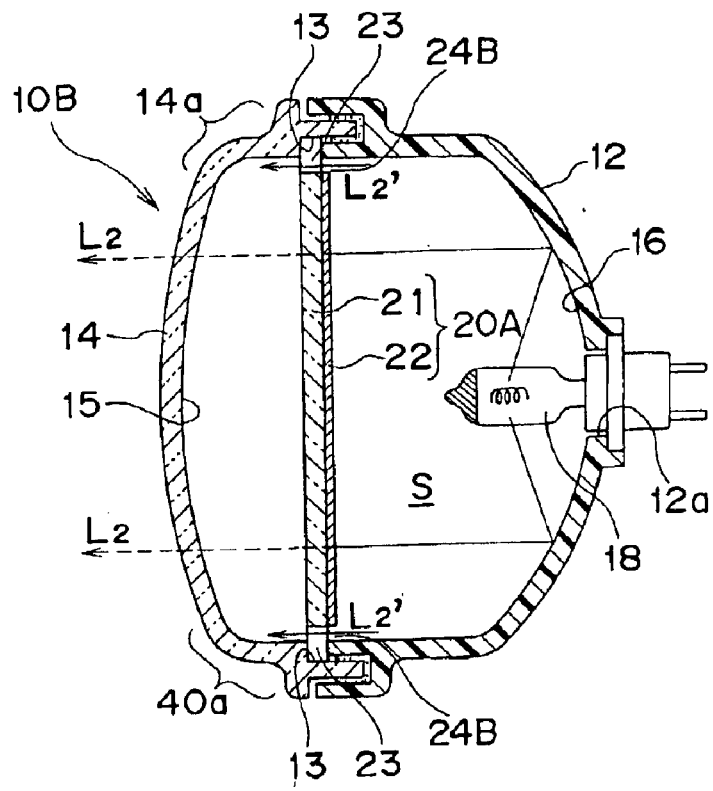
FIG. 3 is a longitudinal sectional view of an infrared radiating lamp in accordance with a second embodiment of the invention.

FIG. 3 is a longitudinal sectional view of an infrared radiating lamp constructed in accordance with a second embodiment of the invention.

In the foregoing first embodiment, the infrared transmitting filter 20 is mounted in the front opening portion of the lamp body 12 so as to close the lamp chamber S, and the infrared transmitting film 22 is formed thereon, leaving a peripheral portion of the glass plate 21 with no infrared transmitting film mounted thereon. However, in the infrared radiating lamp 10B of the second embodiment, an infrared transmitting filter 20A, composed of an infrared transmitting film 22 formed over the entire surface of a rear side of a glass plate 21, is disposed so as to form a predetermined gap (region 24B having no infrared transmitting film) between the lamp chamber S and the inner peripheral surface thereof. That is, engagement protrusions 23 are provided at a plurality of positions along the circumference of the infrared transmitting filter 20A. The engagement protrusions 23 of the infrared transmitting filter 20A are engaged in a groove 13 formed in an engagement portion between the lamp body 12 and the front lens 14, thereby positioning and fixing the infrared transmitting filter 20A in the lamp chamber S.

When the lamp is turned on, light from the light source reflected from the reflector 16 passes through the infrared transmitting filter 20A including the infrared transmitting film 22, as indicated by reference character $L_2$ in FIG. 2, whereby the visible light component is substantially cut off. Therefore, light composed mainly of an invisible infrared component is irradiated through the front lens 14. However, the outgoing light from the front lens 14 still contains some visible light component (red light component) that is not cut by the infrared transmitting film 22. Therefore when the lamp is on, the front lens 14 emits some amount of red light. However, light that does not pass through the infrared transmitting film 22 is directed to a peripheral portion of the front lens 14 via the gap (the region 24B having no infrared transmitting film), as indicated by reference character $L_2'$ in FIG. 2. Therefore, the peripheral portion 14a of the front lens 14 emits white light, thus diluting the red color of the light emitted from the front lens 14 and making the red color less conspicuous.

The forward and rearward lamp chambers S separated by the infrared transmitting filter 20A communicate with each other via gaps between the lamp chamber inner peripheral wall surfaces and a peripheral portion of the infrared transmitting filter 20A. Therefore, air convection occurs between the forward and rearward chambers via the gaps, thus mitigating the retention of heat within the lamp chamber S.

Figure 4:
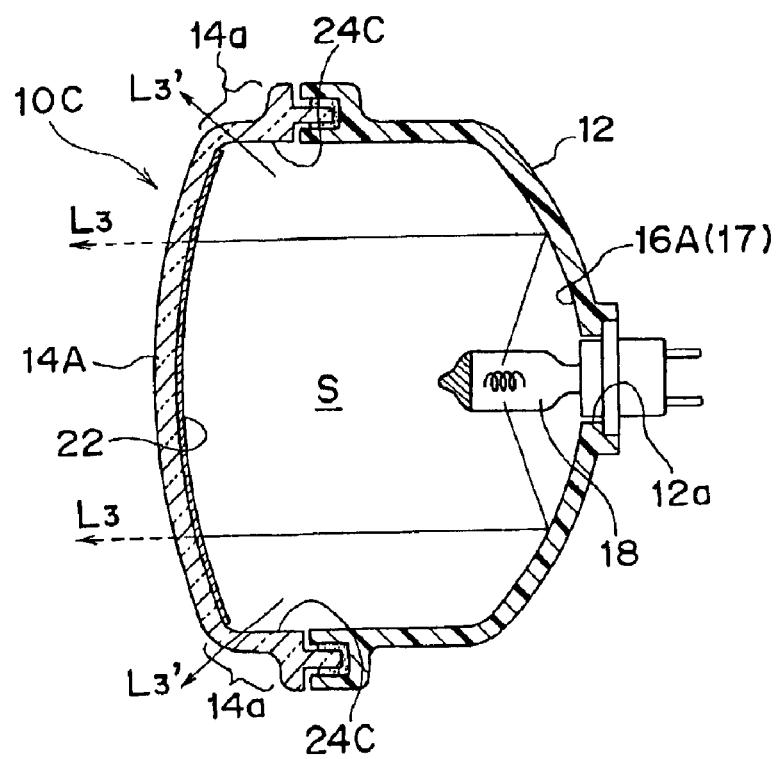
FIG. 4 is a longitudinal sectional view of an infrared radiating lamp in accordance with a third embodiment of the invention.

FIG. 4 is a longitudinal sectional view of an infrared radiating lamp constructed in accordance with a third embodiment of the invention.

The infrared radiating lamp 10C of the third embodiment employs a reflection-type illumination optical system in which a reflector 16A has a plurality of continuous divided reflecting surfaces 17 for light distribution control, and a predetermined distribution of light is achieved by diffused reflected light from the divided reflecting surfaces 17. A front lens 14 has no light distribution control steps 15 as in the case of first embodiment, but has a simple transmission surface.

An infrared transmitting, filter 20 is formed directly on the rear surface of the front lens 14A corresponding to the design surface thereof. A band-like region 24C having no infrared transmitting film is provided on an inner surface of a side wall of the front lens 14A, that is, a peripheral portion of the front lens 14A.

When the lamp is turned on, light from the light source reflected by the reflector 16A passes through the infrared transmitting film 22, as indicated by reference character $L_3$ in FIG. 4, whereby most of the visible light component is cut off. Therefore, light composed mainly of an invisible infrared component is emitted through the front lens 14. However, the outgoing light from the front lens 14A still contains a visible light component (red light component) that is not cut off by the infrared transmitting film. Therefore, when the lamp is on, the front lens 14 emits some amount of red light. However, light from the light source that does not pass through the infrared transmitting film 22 is directed to a peripheral portion of the front lens 14A via the region 24C having no infrared transmitting film, as indicated by reference character $L_3'$ in FIG. 4. Therefore, the peripheral portion 14a of the front lens 14A emits white light, thus diluting the red color of light emission from the front lens 14 and making the red color less conspicuous.

Figure 5:
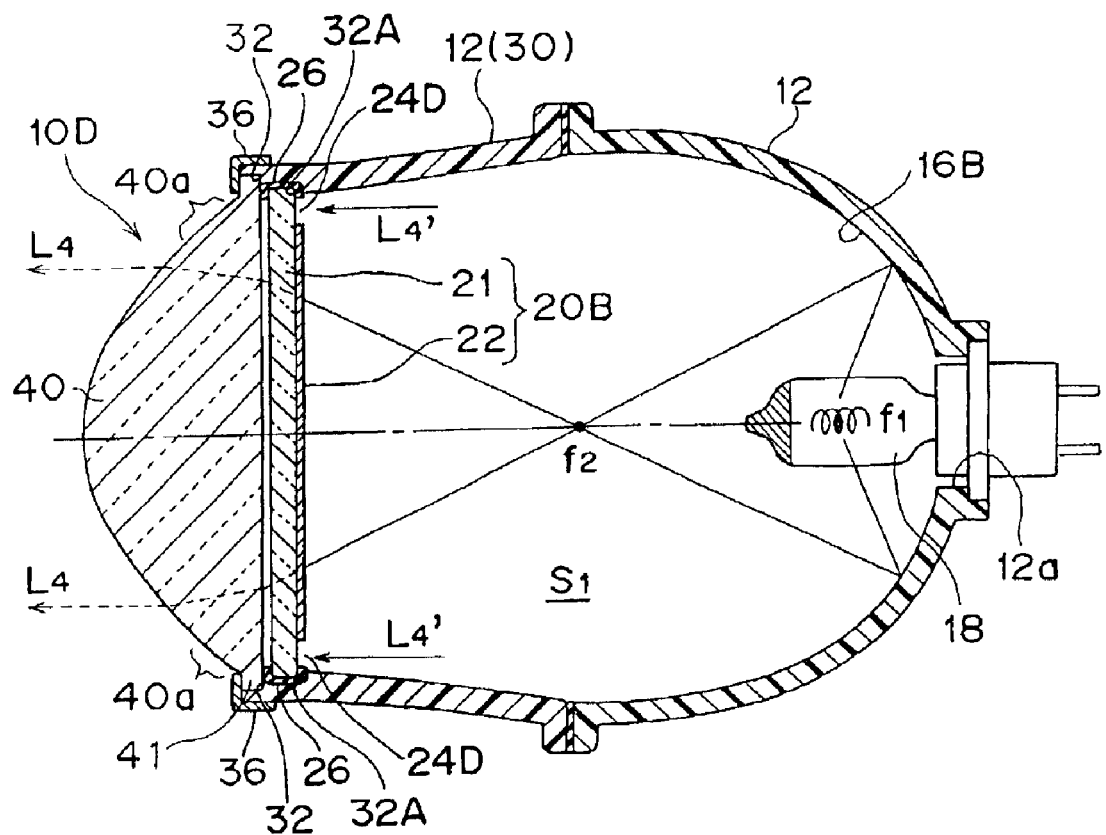
FIG. 5 is a longitudinal sectional view of an infrared radiating lamp in accordance with a fourth embodiment of the invention.

FIG. 5 is a longitudinal sectional view of an infrared radiating lamp constructed in accordance with a fourth embodiment of the invention.

The foregoing first to third embodiments employ a reflection-type illumination optical system in which light from the light source is reflected by the reflector 16 so as to form substantially parallel rays, and the light rays are distributed in a diffused fashion by the light distribution control steps of the front lens 14, or in which light from the light source is distributed in a diffused reflected manner by the reflector 16A that has a plurality of continuous divided reflecting surfaces 17. In contrast, the infrared radiating lamp 10D in the fourth embodiment employs a projection-type illumination optical system in which light from the light source is reflected by an ellipsoidal reflector 16B, and the reflected light is projection-distributed in the form of a substantially parallel beam by a projection lens 40.

A halogen bulb 18 is mounted so that the filament of the bulb 18 is positioned at a first focal point $f_1$ of the metallic ellipsoidal reflector 16B, which forms a lamp body 12. metallic cylindrical lens holder 30, which forms the lamp body 12, is fixed to tie reflector 16B. A front opening portion of the lens holder 30 securely retains the projection lens 40 via an annular lens retainer frame 36 that has an "L" shape in cross section. Reference numeral 32 indicates a stepped portion that extends along an inner peripheral portion of the front opening portion of the lens holder 30 which is used to retain a flange portion 41 of the lens 40. Light from the light source reflected by the reflector 16B is converged at a second focal point $f_2$ of the reflector 16B, and then is formed into a substantially light beam parallel to the optical axis of the reflector 16B, as indicated by reference character $L_4$, by the projection lens 40 disposed forward of the reflector 16B. Thus, a substantially parallel beam is projected and distributed forward.

A ring-shaped stepped portion 32A for retaining a filter is formed in an inner peripheral portion of the lens retraining stepped portion 32 formed in the front opening portion of the lens holder 30. An infrared transmitting filter 20B received by the stepped portion 32A is fixed and retained, together with the projection lens 40, to the front opening portion of the lens holder 30 by the lens retainer frame 36. Reference numeral 26 indicates a rubber member that extends along the peripheral portion of the infrared transmitting filter 20B. The infrared transmitting filter 20B and the projection lens 40 are spaced from each other by a distance corresponding to the thickness of the rubber member 26.

Similarly to the infrared transmitting filter 20 described above in conjunction with the first embodiment, the infrared transmitting filter 20B has a structure in which an infrared transmitting film 22 is formed over a rear surface of a transparent glass plate 21 except for a peripheral portion of the rear surface, and a ring-shaped region 24D having no infrared transmitting film is present in a peripheral portion of the infrared transmitting filter 20B (glass plate 21). The ring-shaped region 24D has a predetermined width.

When the lamp is turned on, light from the light source reflected by the reflector 16B passes through the infrared transmitting filter 20B (the infrared transmitting film 22 thereof), as indicated by reference character $L_4$ in FIG. 5, whereby the visible light component is mainly cut off. Therefore, light composed primarily of an invisible infrared component is emitted from the projection lens 40. However, the outgoing light from the projection lens 40 still contains a visible light component (red light component) that is not cut by the infrared transmitting film. Therefore, when the lamp is on, the projection lens 40 emits some amount of red light. However, light from the light source that does not pass through the infrared transmitting film 22 is directed to a peripheral portion of the projection lens 40 via the region 24D having no infrared transmitting film, as indicated by reference character $L_4'$ in FIG. 5. Therefore, the peripheral portion 40a of the projection lens 40 emits white light, thus diluting the red color of light emitted from the projection lens 40 and making the red color less conspicuous.

The infrared transmitting filter 20B is disposed at a position sufficiently remote from the second focal point $f_2$, at which high temperature occurs due to the convergence of light, that the possibility of thermal deterioration of the infrared transmitting film 22 is significantly reduced.

Figure 6:
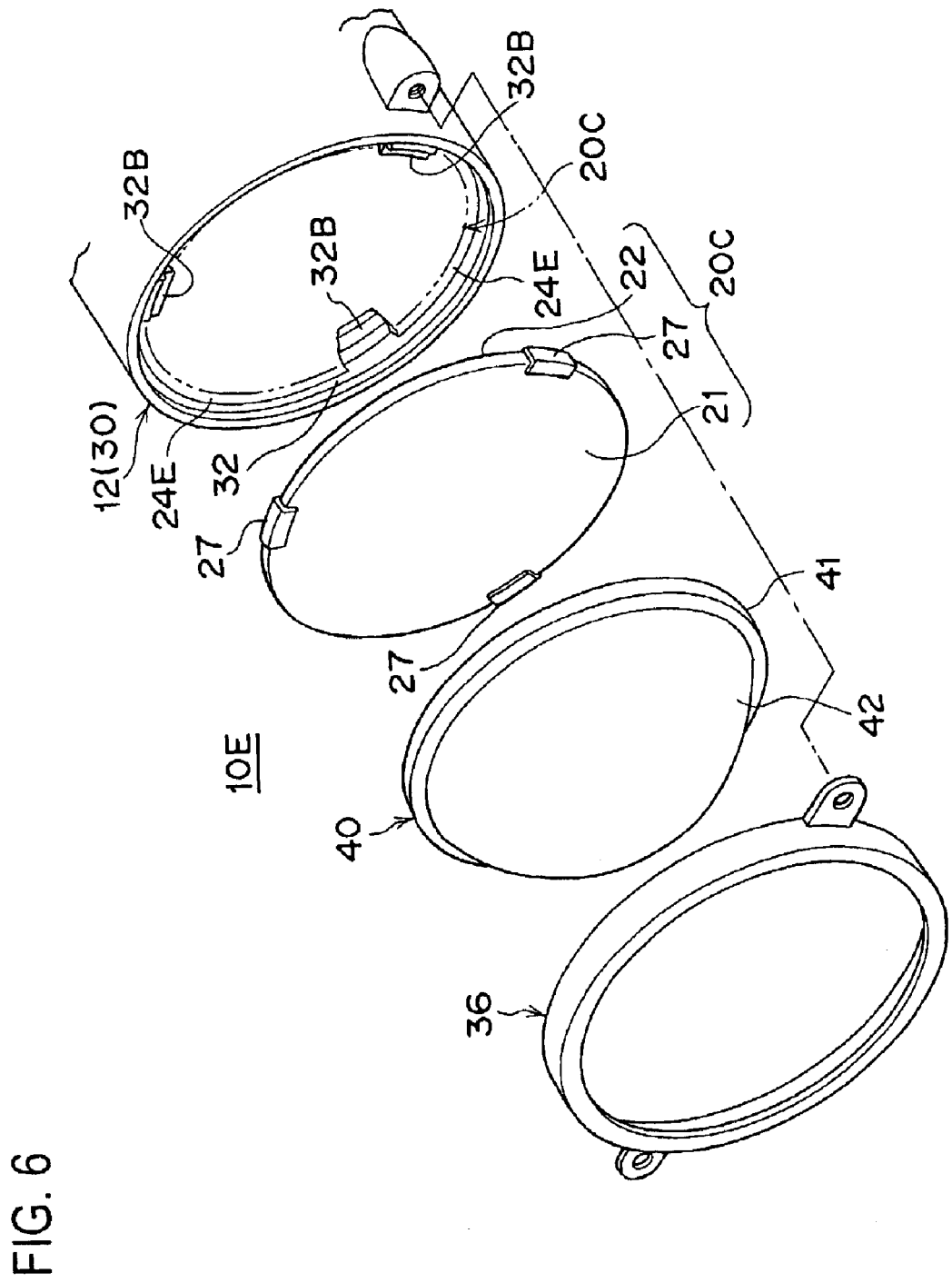
FIG. 6 is a perspective view of portions of the infrared radiating lamp of the fifth embodiment of the invention.

FIG. 6 is a perspective view of portions of the infrared radiating lamp of the fifth embodiment of the invention.

In the previously described fourth embodiment (see FIG. 5), the infrared transmitting filter 20B having in a peripheral portion thereof the region 24D having no infrared transmitting film is disposed so as to close the lamp chamber S1, that is, the infrared transmitting filter 20B is disposed so that the peripheral portion of the filter contacts an inner peripheral surface of the lens holder 30. In the infrared radiating lamp 10E in the fifth embodiment, however, an infrared transmitting filter 20C in which an infrared transmitting film 22 is formed over the entire rear surface of a glass plate 21 is disposed so that a peripheral portion of the filter is spaced slightly apart from the inner peripheral surface of the lens holder 30. Thus, a region 24E having no infrared transmitting film is provided around the periphery of the infrared transmitting filter 20C.

That is, filter-retaining inward protrusions 32B with stepped portions are formed at three equidistant sites along the circumference of a lens-retaining stepped portion 32 formed in a front opening portion of the lens holder 30.

When the infrared transmitting filter 20C is received by the inward protrusions 32B, a gap (a region 24E having no infrared transmitting film) is formed around the periphery of the infrared transmitting filter 20C. As in the fourth embodiment, the infrared transmitting filter 20C and the projection lens 40 are together fixed and mounted to the front opening portion of the lens holder 30 via the lens retainer frame 36. Reference numeral 27 indicates rubber members provided on a peripheral portion of the infrared transmitting filter 20B corresponding to the inward protrusions 32B. Therefore, the infrared transmitting filter 20C and the projection lens 40 are spaced apart from each other by a distance corresponding to the thickness of the rubber members 27.

When the lamp is turned on, light from the light source reflected by the reflector 16B passes through the infrared transmitting filter 20C (the infrared transmitting film 22 thereof), whereby a visible light component is cut. Therefore, light composed mainly of an invisible infrared component is emitted from the projection lens 40. However, the outgoing light from the projection lens 40 still contains a visible light component (red light component) that is not cut by the infrared transmitting film. Therefore, when the lamp is on, the projection lens 40 emits some amount of red light. However, light from the light source that does not pass through the infrared transmitting film 22 is directed to a peripheral portion of the projection lens 40 via the ring-shaped gap (the region 24E having no infrared transmitting film) between an inner peripheral surface of the lens holder 30 and a peripheral portion of the infrared transmitting filter 20C. Therefore, the peripheral portion 40a of the projection lens emits white light, thus diluting the red color of the light emitted from the projection lens 40 and making the red color less conspicuous.

Furthermore, the forward and rearward lamp chambers divided by the filter 20C communicate with each other via the gap 24E between the filter 20C and the lens holder 30. Therefore, air convection occurs between the forward and rearward chambers via the gap, thus preventing retention of heat within the lamp chamber and reducing the possibility of thermal deterioration of the infrared transmitting film 22.

Figure 7:
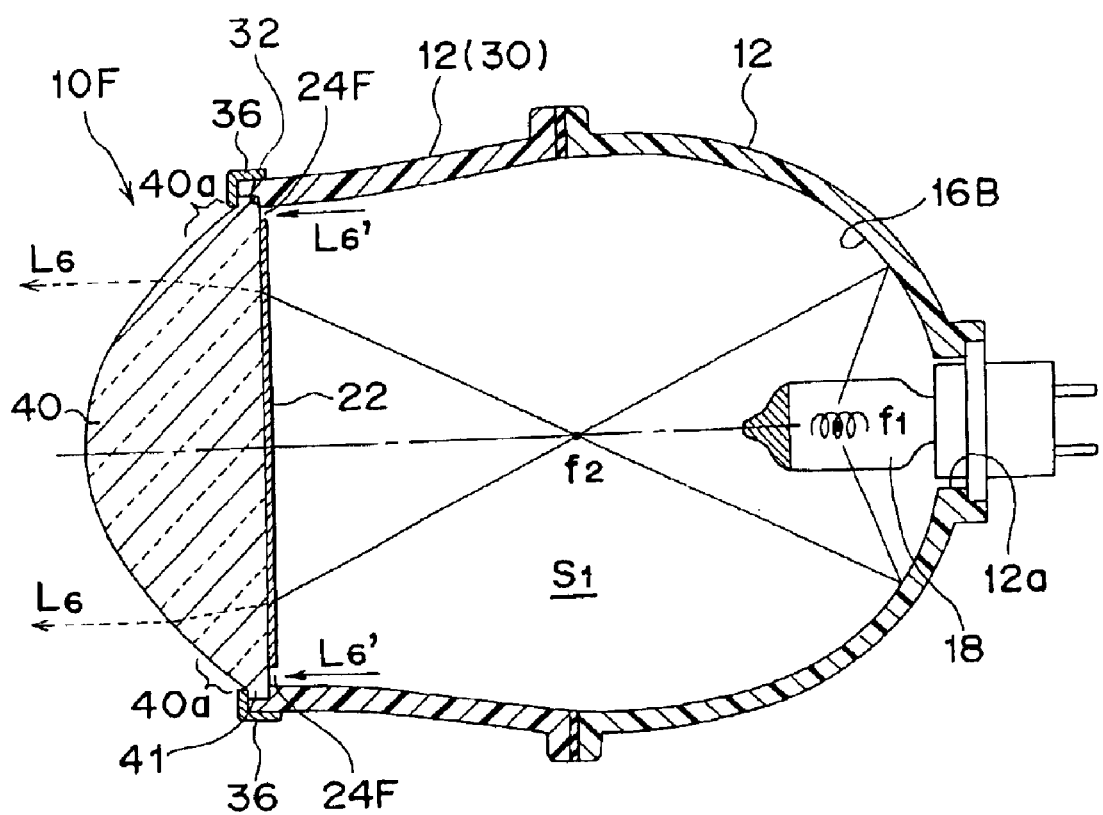
FIG. 7 is a longitudinal sectional view of an infrared radiating lamp in accordance with a sixth embodiment of the invention.

FIG. 7 is a longitudinal sectional view of an infrared radiating lamp constructed in accordance with a sixth embodiment of the invention.

In an infrared radiating lamp 10F in this embodiment, an infrared transmitting film 22 is formed directly on the rear surface of a projection lens 40. A region 24F having no infrared transmitting film and having a predetermined width is provided in a peripheral portion of the rear surface of the projection lens 40.

When the lamp is turned on, light from the light source reflected from the reflector 16B passes through the infrared transmitting film 22, as indicated by reference character $L_6$ in FIG. 7, whereby a visible light component is cut off. Therefore, light composed mainly of an invisible infrared component passes through the projection lens 40. However, the outgoing light from the projection lens 40 still contains a visible light component (red light component) that is not cut off by the infrared transmitting film. Therefore, when the lamp is on, the projection lens 40 emits some amount of red light. However, light from the light source that does not pass through the infrared transmitting film 22 is directed to a peripheral portion of the projection lens 40 via the region 24F having no infrared transmitting film, as indicated by reference character $L_6'$ in FIG. 7. Therefore, the peripheral portion 40a of the projection lens emits white light, thus diluting the red color of the light emitted from the projection lens 40 and making the red color less conspicuous.

Figure 8:
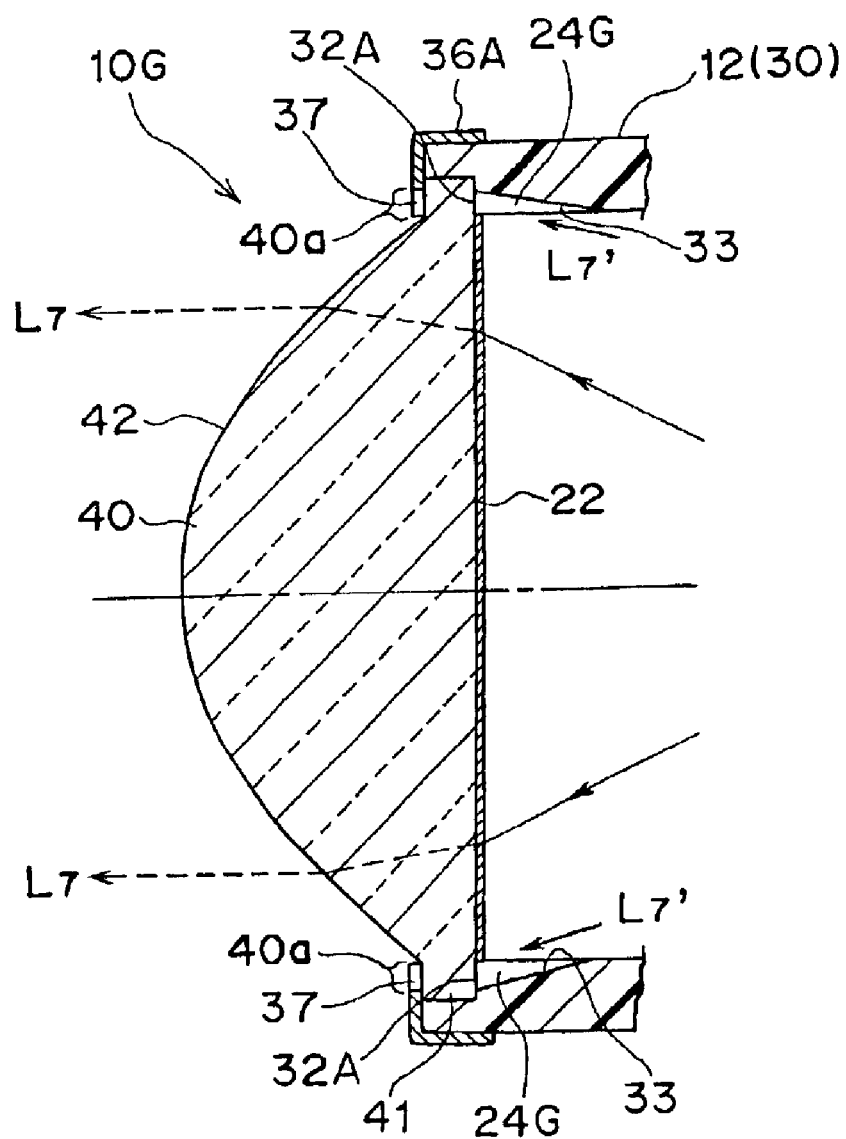
FIG. 8 is a longitudinal sectional view of an infrared radiating lamp.
Figure 9:
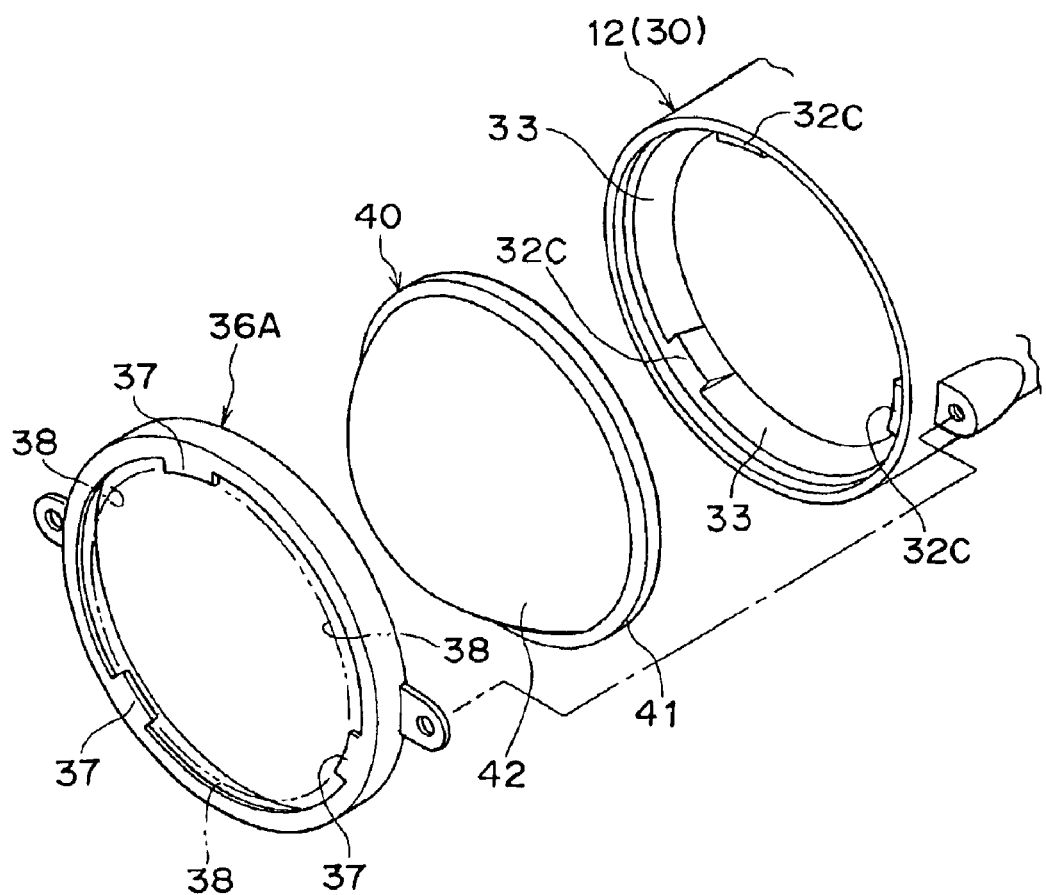
FIG. 9 is an exploded perspective view of the lamp.

FIGS. 8 and 9 illustrate a seventh embodiment of the invention. FIG. 8 is a longitudinal sectional view of an infrared radiating lamp. FIG. 9 is an exploded perspective view of the lamp.

In the infrared radiating lamp 10G of this embodiment, an infrared transmitting film 22 is formed over a rear surface of a projection lens 40, except for a flange portion 41 of the projection lens 40. That is, the infrared transmitting film 22 is formed on a portion of the rear surface of the projection lens 40 corresponding to an expanded lens portion 42. The flange portion 41 of the projection lens 40 is provided with a region 24G having no infrared transmitting, film.

Three stepped portions 32C for retaining a projection lens 40 (a flange portion 41 thereof) are formed in a front opening portion of the lens holder 30 by cutting out an inner peripheral portion of the opening portion in a tapered fashion at three equidistant sites in the circumferential direction. Therefore, light from the light source that does not pass through the infrared transmitting film 22 is directed to the flange portion 41. Reference numeral 33 indicates a tapered surface.

A lens retainer frame 36A is provided for securing the flange portion 41 of the projection lens 40 to a forward edge portion of the lens holder 30. An inner peripheral portion of the lens retainer frame 36A is cut out in an arcuate shape at three equidistant sites in the circumferential direction so that three hooks 37 are formed corresponding to the stepped portions 32A of the lens holder 30. Therefore, light from the light source directed to the flange portion 41 is emitted forward without being cut by the lens retainer frame 36A. Reference numeral 38 indicates cutouts in an inner peripheral portion of the lens retainer frame 36A.

When the lamp is turned on, light from the light source reflected by the reflector 16B passes through the infrared transmitting film 22, as indicated by reference character $L_7$ in FIG. 8, whereby a visible light component is cut off. Therefore, light composed mainly of an invisible infrared component is emitted from the projection lens 40. However, the outgoing light from the projection lens 40 still contains a visible light component (red light component) that is not cut off by the infrared transmitting film 22. Therefore, when the lamp is on, the projection lens 40 emits some amount of red light. However, light from the light source transmitted through the region 24G having no infrared transmitting film and not blocked by the stepped portions 32C or the lens retainer frame 36A (the hooks 37 thereof) (light from the light source that does not pass through the infrared transmitting film 22) is emitted from the flange portion 41 of the projection lens 40, as indicated by reference character $L_7'$ in FIG. 8. Therefore, the peripheral portion 41 of the projection lens 40 emits white light, thus diluting the red color of the light emitted from the projection lens 40 and making the red color less conspicuous.

In the foregoing embodiments, the infrared transmitting film is formed on the rear surface of the glass plate 21, the front lens 14, 14A, the projection lens 40, etc. However, it is also possible to form an infrared transmitting film only on the front surface, or both the front and rear surfaces.

Furthermore, in the foregoing embodiments the region having no infrared transmitting film is formed around the periphery of the infrared transmitting film, and the peripheral portion of the lens therefore emits white light so as to dilute the emission of red light from the lamp. However, it is also possible to employ a construction in which small pores, namely, small regions having no infrared transmitting film, are formed in the infrared transmitting film in a dispersed pattern so that a small amount of white light is emitted from a generally central portion of the lens. Furthermore, it is also possible to form a region having no infrared transmitting film around the periphery of the infrared transmitting film and to provide small pores as regions having no infrared transmitting film within the infrared transmitting film in a dispersed pattern so that the emission of red light from the lamp is diluted.

As is apparent from the foregoing description, red light emitted from the lamp is diluted by white light emitted from a lens peripheral portion or a generally central portion of the lens. Therefore, unlike the conventional practice, the lamp does not appear to glow red. Hence, there is no danger that a driver or a pedestrian may falsely recognize the infrared radiating lamp as a tail lamp or a stop lamp. Correspondingly, safety can be assured.

If a region having no infrared transmitting film is formed around the periphery of the infrared transmitting film, it is appropriate to form the infrared transmitting film by coating or vapor deposition after masking a portion corresponding to a region having no infrared transmitting film. Therefore, formation of the region having no infrared transmitting film is easier than in the case where a region having no infrared transmitting film is formed in a infrared transmitting film.

Moreover, when it is necessary to replace the transparent member (including the infrared transmitting filter), it is appropriate to replace only the infrared transmitting filter without replacing other component parts of the lamp, thus reducing costs.

Furthermore, since the transparent member is smaller in size than the lens, the number of pieces which can be produced per batch at the time of manufacturing the infrared transmitting films can be increased (i.e., the number of transparent members as which can be placed in a vapor deposition furnace is increased), and hence the costs involved in the formation of infrared transmitting films are reduced.

Also, because an infrared transmitting film can be formed directly on the lens, the lamp structure becomes less complicated than in the case where an infrared transmitting film is formed on a transparent member. Furthermore, heat is not retained in the lighting chamber, so that the thermal deterioration of the infrared transmitting film is reduced. Hence, a stable amount of infrared light is secured over a long period of time.

It should further be apparent to those skilled in the art that various changes in form and detail of the invention as shown and described above may be made. It is intended that such changes be included within the spirit and scope of the claims appended hereto.

What is claimed is:

1. An automotive infrared radiating lamp comprising: a lamp body; a lens mounted over a front opening of said lamp body; a reflector provided inside said lamp body; a light source provided between said reflector and said lens; and an infrared transmitting film disposed in a path of light between said light source and said lens for transmitting infrared light and at least partially blocking visible light, a region having no infrared transmitting film being provided in said light path, wherein said region having no infrared transmitting film is provided at an outer periphery of said infrared transmitting film.

2. An automotive infrared radiating lamp comprising: a lamp body; a lens mounted over a front opening of said lamp body; a reflector provided inside said lamp body; a light source provided between said reflector and said lens; and an infrared transmitting film disposed in a path of light between said light source and said lens for transmitting infrared light and at least partially blocking visible light, a region having no infrared transmitting film being provided in said light path, further comprising a transparent member provided between said reflector and said lens, and said infrared transmitting film being provided on a surface of said transparent member, wherein said transparent member comprises a plurality of engagement protrusions along its periphery, said engagement protrusions being engaged with a groove formed between said lens and said lamp body.

3. An automotive infrared radiating lamp comprising: a lamp body; a lens mounted over a front opening of said lamp body; a reflector provided inside said lamp body; a light source provided between said reflector and said lens; and an infrared transmitting film disposed in a path of light between said light source and said lens for transmitting infrared light and at least partially blocking visible light, a region having no infrared transmitting film being provided in said light path, further comprising a transparent member provided between said reflector and said lens, and said infrared transmitting film being provided on a surface of said transparent member, wherein said transparent member forms a plurality of gaps with said lamp body to allow air convection between portions of said lamp chamber on opposed sides of said transparent member.

4. An automotive infrared radiating lamp comprising: a lamp body; a lens mounted over a front opening of said lamp body; a reflector provided inside said lamp body; a light source provided between said reflector and said lens; and an infrared transmitting film disposed in a path of light between said light source and said lens for transmitting infrared light and at least partially blocking visible light, a region having no infrared transmitting film being provided in said light path, wherein said infrared transmitting film is provided on an inner surface of said lens.

5. The automotive infrared radiating lamp according to claim 4, wherein said lens is a projection-type lens.

6. An automotive infrared radiating lamp comprising: a lamp body; a lens mounted over a front opening of said lamp body; a reflector provided inside said lamp body, said reflector having formed therein a plurality of continuous divided reflecting surfaces for providing light distribution control; a light source provided between said reflector and said lens; and an infrared transmitting film disposed on an inner surface of said lens for transmitting infrared light and at least partially blocking visible light, a region having no infrared transmitting film being provided around a periphery of said infrared transmitting film.

7. An automotive infrared radiating lamp comprising: a lamp body; a projection lens mounted over a front opening of said lamp body for forming a generally parallel beam of light; an ellipsoidal reflector provided inside said lamp body; a light source provided between said reflector and said lens; and an infrared transmitting film disposed on an inner substantially planar surface of said lens for transmitting infrared light and at least partially blocking visible light, a region having no infrared transmitting film being provided around a periphery of said infrared transmitting film.

* * * * *